Patented Oct. 24, 1922.

1,433,099

UNITED STATES PATENT OFFICE.

REED P. ROSE, OF NEW YORK, N. Y., ASSIGNOR TO MORGAN & WRIGHT, A CORPORATION OF MICHIGAN.

PROCESS OF COMPOUNDING AND VULCANIZING RUBBER AND PRODUCTS THEREOF.

No Drawing.     Application filed May 18, 1920. Serial No. 382,259.

*To all whom it may concern:*

Be it known that I, REED P. ROSE, a citizen of the United States, residing at New York, county of New York, State of New York, have invented new and useful Improvements in Processes of Compounding and Vulcanizing Rubber and Products Thereof, of which the following is a full, clear, and exact description.

This invention relates to the compounding of rubber and similar materials and more particularly to the use of a material activated while in the form of a substantially dry powder such as carbon, clay, etc., in processes for compounding rubber, and the products thereof.

Among the various substances in common use as ingredients in the compounding of rubber and similar materials, carbon in the form of charcoal, carbon black, or lamp black, has been of primary importance. Its function has been either to act as a pigment or to furnish tensile strength to the finished rubber product or to act in both capacities. The forms of carbon used have been those readily obtainable on the market and have been employed in the compounding processes without further preliminary treatment.

It is an object of this invention to compound and vulcanize rubber with a specially treated carbon so that a finished rubber product will be produced having materially greater tensile strength, resistance to abrasion, hardness, and toughness than rubber produced by compounding with untreated carbon. It is also an object of this invention to provide a process which will permit vulcanization to be accomplished in a shorter time than by previous processes. It is furthermore an object of the invention to provide a process which shall produce rubber products having superior qualities in general than the products now on the market.

The invention accordingly consists in a process for treating rubber and the products of such process, comprising mixing with rubber or the like a material activated by the removal of foreign substances from its surfaces, milling and vulcanizing the mixture. More specifically it consists in a process for treating rubber or the like, and the products of such process, comprising mixing activated carbon therewith, milling and vulcanizing the mixture. By the term "activated carbon" is meant the product resulting from subjecting an ordinary form of carbon to a purifying treatment whereby it becomes more effective in its influence on the vulcanization process and aids in producing a better quality of rubber, apparently because of the removal of foreign substances from its surfaces thereby making the latter more extensive and active. "Activated material" refers to any substance whose surfaces have been freed from adhering impurities by heat or solvent action.

In carrying out the invention in its preferred form, 100 parts of rubber and 10 parts of sulphur are milled with 36 grams of carbon black (specific gravity 1.75–1.85) activated by calcination at a temperature of 1000° C. for ninety minutes. After thorough incorporation the mixture is vulcanized at 40 lbs. steam pressure for three hours. The resulting rubber shows a tensile strength about 13% higher than that of rubber treated in a similar way with ordinary unactivated carbon black. The product of this treatment possesses besides its superior tensile strength, a resistance to abrasion, toughness, and a hardness superior to rubber treated with unactivated carbon. It will also be observed that the time of cure or vulcanization is reduced by one-quarter, the normal time for curing a similar mixture containing unactivated carbon being four hours.

As an alternative to the above preferred embodiment, the following is given: 100 parts of rubber and 10 parts of sulphur are milled with 36 grams of carbon black activated by calcination at 1000° C. for 6 hours. After thorough incorporation, the mixture is vulcanized at 40 lbs. steam pressure for three hours. The resulting rubber has a tensile strength about 5% higher than that of rubber treated similarly with unactivated carbon black.

Another alternative procedure consists in the following: 100 parts of rubber and 10 parts of sulphur are milled with 36 grams carbon black, activated by treating it at 1000° C. with steam for a period of 90 minutes. After a thorough incorporation the mixture is vulcanized at 40 lbs. steam pressure for four hours. The resulting rubber has a tensile strength about 7% higher than that of rubber similarly treated with unactivated carbon.

The activated carbon used in the above preferred embodiment and in the alternative procedures given, is a kind of carbon produced by heating ordinary carbon black or gas carbon, charcoal, or lamp black, at temperatures lying within a broad range of 400–1200° C. for various periods of time. The most satisfactory kinds of activated carbon are generally produced by heating these various forms of ordinary carbon at temperatures lying between 800–1000° C. for approximately ninety minutes in the presence of air or steam. It may be said that for most practical purposes the temperature range is 700–1100° C. At temperatures above 1200° C. the carbon sinters and forms lumps which are hard to mix with the rubber. As shown by the examples given in the specification, the time of heating may vary for particular cases and it generally lies within a range of ninety minutes to six hours. It is to be understood that after the heat treatment, the carbon should be cooled in vacuo.

It appears from applicant's experiments that the excellent results obtained by compounding rubber with activated carbon and similar materials are due to the large or extensive active surfaces of this form of carbon, that is they are due to the fact that activated carbon possesses an active surface area per unit mass greater than unactivated carbon. It is believed that upon heating ordinary forms or kinds of carbon, the undecomposed hydrocarbons, oils, tarry materials and other foreign materials contained or lodged in the interstices of the carbon particles or agglomerates are driven off, thereby exposing additional or new surfaces. This exposure of new surfaces gives to the carbon increased capacity for absorption and catalytic activity, and it has been found that there is a definite relationship between the absorption (or adsorption) by activated carbon, clays and similar materials, of malachite green and water soluble aniline dyes such as methylene blue, aniline violet, and aniline red, and the tensile strength of rubber compounded with such activated carbon. It has also been found that there is direct relationship between the amount of air given off by the carbon at 130° C. to 135° C., which is the usual vulcanization temperature, and the tensile strength obtained when this carbon was compounded with rubber and sulphur and vulcanized. The tensile strength has been found to increase in direct proportion with the increase in quantities of air given off at 130° to 135° C. Large quantities of gases are adsorbed on the surfaces of treated carbons and these quantities increase with increased activation of the carbons. The active surfaces of the above described form of carbon are capable of exerting an absorptive, catalytic or other influence upon the compounding ingredients and the vulcanization process, with the result that the time of vulcanization is shortened and a superior product is produced. The increased tensile strengths and increased resistance to abrasion may also be due to a state of surface attraction existing between the rubber and the carbon black, which prevent the particle from being separated from the rubber. It has not been found that the beneficial results of activated carbons depend on grain size of the particles or the existence of capillary openings or tubes therein, so long as a perfect mechanical mixture is obtained.

While rubber has been mentioned in the above examples, similar substances such as balata, gutta percha and vulcanizable gums of various sorts may be treated with activated carbon and vulcanized as in the above processes.

Activated carbon is one of a number of materials which when combined with rubber and vulcanized produces products having increased tensile strength, resistance to abrasion, and other properties not possessed in so great a degree by rubber treated with unactivated carbon. Among these materials may be mentioned the plastic clays, also known as colloidal clays, and particularly clays which have been subjected to a heat treatment between 500–1000° C. and clays which have been treated with carbon tetrachloride, phosgene, and chlorine plus a small amount of carbon black, at temperatures ranging from 275° to 600° C. Among other materials may be mentioned precipitated and partly dried metallic hydroxides, such as iron hydroxide, and various partly dried gels such as silica gel formed by the precipitation of silicic acid in gelatinous form from solution. These materials belong to the general class of colloids and more specifically belong to that class of substances which have a large surface area per unit mass of material.

Not only is the tensile strength increased by compounding rubber with activated carbon, but the resistance to abrasion is also materially increased. Three carbon blacks prepared by calcining for 90 minutes at 1000° C. compounded in the manner stated in the preferred embodiment of the invention, produce tensile strength in the rubber products lying between 4000 and 4150 lbs. after vulcanization for three hours as compared with 3500–3925 lbs. in the case of untreated carbon. These rubber products showed a 50% increase in resistance to abrasion. A clay treated by calcining at 500° C. for ninety minutes was compounded with rubber and sulphur and vulcanized, yielding a rubber product which showed an increase in resistance to abrasion of 22% as compared with a similar product prepared with untreated clay. The use of activated carbon and similar materials in compounding rubber produces increases in resistance to abrasion amounting to from between 20 to 60%. It has been also found that even with this increased resistance to abrasion, the stretch of the resulting rubber is slightly increased, and hardness tests have shown that the rubber does not resemble hard rubber.

When compounding with activated lampblack in the proportions given in the preferred embodiment, the time for optimum cure is shortened by about 25% and the tensile strength of the rubber is increased by about 10%, lampblack calcined 90 minutes at 800° C. giving one of the best results.

It is therefore evident that by the use of the above processes, the objects of this invention have been achieved, and that a series of products have been produced which possess tensile strength, resistance to abrasion, hardness, toughness and stretch superior to those qualities in rubber treated with ordinary fillers. It is also seen that the rapidity of cure is increased and that the latter is generally made more efficient. As a general rule the tensile strength of the rubber products is increased from 5 to 15%, the resistance to abrasion from 20–60%, and there is an acceleration of vulcanization with the saving of about 25% of the time required at normal temperatures.

As many apparently widely different embodiments of this invention may be made without departing from the spirit thereof, it is to be understood that I do not intend to limit myself to the specific embodiment herein set forth, except as indicated in the appended claims.

Having thus described my invention, what I claim and desire to protect by Letters Patent is:

1. A process of treating rubber or rubber-like materials comprising mixing therewith a material activated while in the form of a substantially dry powder, and vulcanizing the mixture.

2. The process of treating rubber or rubber like materials comprising mixing therewith a material having more extensive active surfaces than ordinary carbon, and vulcanizing the mixture.

3. The process of treating rubber or rubber-like materials comprising mixing activated carbon therewith, and vulcanizing the mixture.

4. The process of treating rubber or similar materials comprising adding thereto carbon activated by heat treatment, and vulcanizing the mixture.

5. The process of treating rubber or similar materials comprising adding thereto carbon activated by heat treatment at a temperature between 400–1200° C., and vulcanizing the mixture.

6. The process of treating rubber or similar materials comprising adding thereto carbon activated by heat treatment at a temperature of 1000° C. for ninety minutes, and vulcanizing the mixture.

7. The process of treating rubber or similar materials comprising adding thereto carbon activated by calcination at a temperature between 400–1200° C., and vulcanizing the mixture.

8. The process of treating rubber or similar materials comprising adding thereto carbon activated by calcination at a temperature of about 1000° C. for about ninety minutes, and vulcanizing the mixture.

9. As a step in the compounding of rubor rubber-like materials, the mixture of activated carbon therewith.

10. As a step in the compounding of rubber or similar materials, the mixing therewith of carbon activated by heat treatment at a temperature between 400–1200° C.

11. As a step in the compounding of rubber or similar materials the mixing therewith of carbon activated by heat treatment at a temperature of approximately 1000° C. for about ninety minutes.

12. A vulcanized rubber derived from rubber combined with a material activated while in the form of a substantially dry powder.

13. A vulcanized rubber derived from rubber combined with a material having more extensive active surfaces than ordinary carbon.

14. A rubber derived from rubber combined with activated carbon and vulcanized.

15. A vulcanized rubber derived from rubber combined with carbon whose surfaces are free from oils, hydrocarbons and tarry matters.

16. A rubber derived from rubber combined with activated carbon and vulcanized having a tensile strength greater than that of similar rubber combined with unactivated carbon.

17. A vulcanized rubber derived from rubber combined with activated carbon and having a tensile strength, resistance to abrasion, hardness and toughness greater than that of similar rubber similarly combined with unactivated carbon.

18. A vulcanized rubber derived from rubber combined with activated carbon and having a tensile strength and resistance to abrasion greater than that of similar rubber similarly combined with unactivated carbon.

Signed at New York, New York, this 17 day of May, 1920.

REED P. ROSE.